G. H. Reay. Sheet 1. 2 Sheets.
Envelope Mach.
No. 2,529. Reissued Mar. 26, 1867.
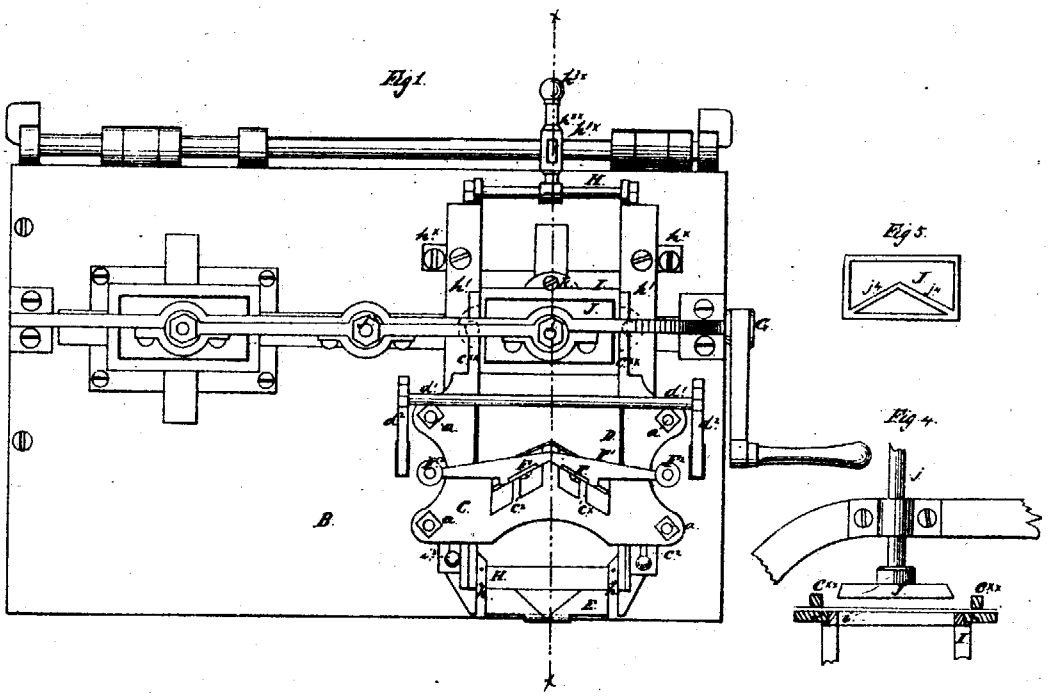
Witnesses.
G W Reed
Robt W Louden
Inventor
Geo H Reay G. H. Reay. Sheet 2 2 Sheets.
Envelope Mach.
No. 2,529. Reissued Mar. 26, 1867.
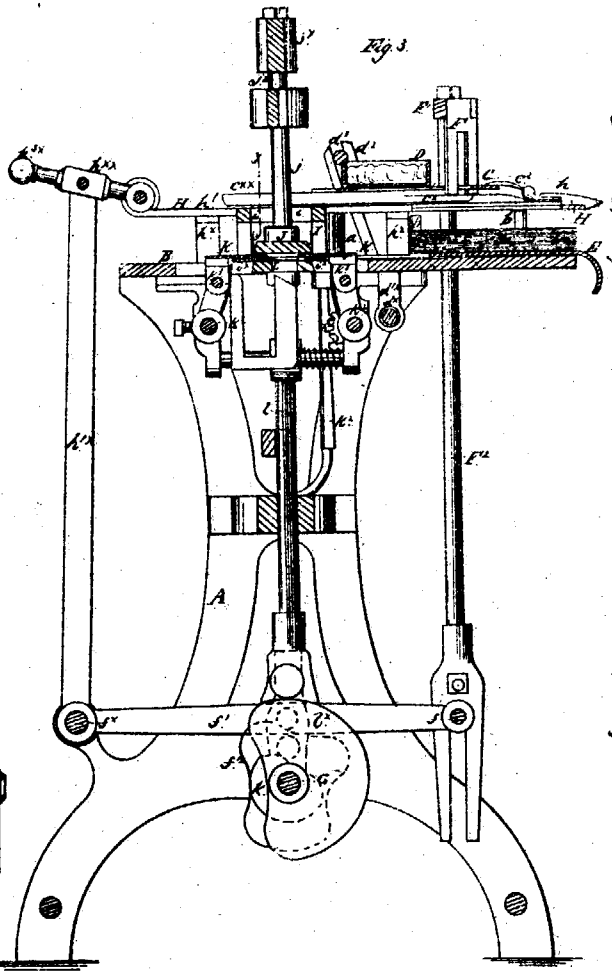
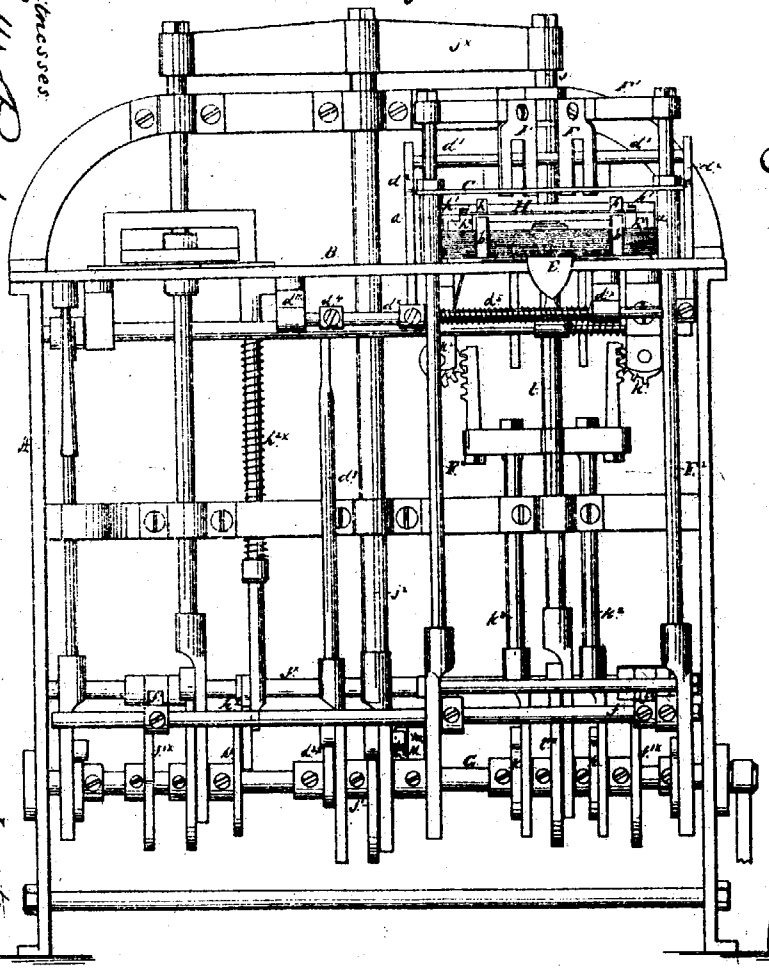
Witnesses:
G W Reed
Robt H London
Inventor
Geo H Reay

BEST AVAILABLE COPY

United States Patent Office

GEORGE H. REAY AND LOUIS NEGBAUR, OF NEW YORK, N. Y., ASSIGNEES BY MESNE ASSIGNMENTS OF GEORGE H. REAY.

*Letters Patent No.* 39,702, *dated August* 25, 1863; *reissue No.* 2,529, *dated March* 26, 1867.

ENVELOPE MACHINE.

The Schedule referred to in these Letters Patent and making part of the same.

TO ALL WHOM IT MAY CONCERN:

Be it known that GEORGE H. REAY, of the city, county, and State of New York, has invented certain new and useful improvements in Envelope Machines; and we, GEORGE H. REAY and LOUIS NEGBAUR, assignees by mesne assignments of the whole right and title in said invention, do hereby declare that the following is a full, clear, and exact description of the same, which will enable those skilled in the art to make and use it, reference being had to the accompanying drawing, making a part of this specification, in which—

Figure 1 represents a plan or top view of this invention.

Figure 2 is a front elevation of the same.

Figure 3 is a transverse vertical section of the same, the line *x x*, fig. 1, indicating the plane of section.

Figure 4 is a detached section of the box, which, in conjunction with the plunger, serves to crease the envelope.

Figure 5 is an inverted plan of the plunger.

Figure 6 is a detached sectional view of the plunger and folding-fingers.

Figure 7 is a detached elevation of the device for pressing the envelopes

Similar letters of reference in the several views indicate corresponding parts.

This invention relates to a movable slide placed under the lifter or lifters, in such a manner that a fresh supply of blanks can be introduced under the lifters at any moment whenever the lifters begin to rise, without stopping the machine; also, to a peculiar arrangement of the lifter and table which supports the gum-box, and under which the blanks are conveyed to the creasing-box in such a manner that the table itself pulls off the blanks from the lifters and retains them in a correct position for the plunger to act upon; further, to certain improvements in the mechanism employed to impart the desired motion to the gum-box in relation to the lifters, to counterbalance the conveyer to crease, fold, and press the envelopes, and to discharge them from the machine when finished.

To enable others skilled in the art to make and use this invention, we will proceed to describe it.

A represents a frame made of iron or any other suitable material, which supports the working parts of our machine. This frame is provided with a platform, B, and on the top of this platform, and supported by small columns, *a*, is the table C, which supports the gum-box D. The blanks, which are indicated in red outlines in the various figures, are placed or a slide or carrier, E, which may be provided with projecting lugs, *h*, to retain the same in the proper position, and which can be moved in under the gum-box and out from under the same at pleasure. When moved out said slide or carrier is clear off the table C, and in such a position that a fresh supply of blanks can be introduced without difficulty. The carrier with the blanks is then pushed back under the table, and in the proper position to be acted upon by the lifters E. These lifters are secured in an angular position to the cross-head $F^1$, which is secured to the upper ends of rising and falling rods, $F^2$. The lower forked ends of the rods $F^2$ catch over a bar, *f*, which is supported by arms, $f^1$, which are loosely attached to a shaft or rod, $f^*$, and to which an oscillating motion is imparted by a cam $f^{1*}$, on the main driving-shaft G. As the bar *f* rises by the action of the arms $f^1$, it carries up with itself the vertical rods $F^2$, and the lifters F, and when the bar with the arms descends the lifters sink down, until they strike either the gum-box or the pile of blanks on the slide E, or, if both the slide and the gum-box are out of the way, the lifters sink down as far as the motion of the arms $f^1$ will allow. It will thus be seen that the lifters act upon the blanks entirely by their own gravity, and consequently they will come down upon the blanks with the same force, no matter what the thickness or height of the pile of blanks upon the slide, carrier, or platform E. The gum-box D is placed loosely upon the table C, and it is provided with two gudgeons, $d^1$, which extend into slotted arms, $d^2$. These arms are rigidly connected to a rock-shaft, $d^*$, which has its bearings in hangers, $d^{1*}$, under the platform B, and to which an oscillating motion is imparted from the main driving-shaft by the action of a cam, $d^{2*}$, on a rising and falling rod, $d^3$, which connects with an arm, $d^4$, extending from the rock-shaft. A spiral spring, $d^5$, wound round said rock-shaft, has a tendency to carry the gum-box back to its original position as soon as the action of the cam $d^{2*}$ on the rod $d^3$ ceases. The cam $d^{2*}$ is so shaped that the gum-box is carried forward just when the lifters have reached their highest point, and it is retained under the lifters until the latter come down, take up some gum, and rise again, to let the gum-box go back. The lifters thus charged with gum descend, and, by being pressed upon the blanks, carry one of them up and hold it close under the table C, ready to be taken off by the conveyer H. The lifters are slotted, and they pass down through slots in the table, which leave a bar, $c^*$, to work up and down in the slots of the lifters. If a blank is carried up by the lifters, it strikes the lower surface of the table, and it is readily detached from the lifters and deposited on the conveyer. The bar $c^*$ in the slots of the table materially assists in detaching the blanks, and prevents the same becoming wrinkled and uneven. The conveyer is provided with hooks, $h$, which catch over the edge of the blank and carry the same in as the conveyer is moved across the platform B. Small weights, $c^2$, which are hinged to the front edge of the table C, bear down upon the ends of each blank as the same is raised by the lifters, and hold the same in such a position that it will be caught by the hooks of the conveyer, whether the paper be even or warped. Without these weights, and if the blank is warped, the hooks, or one of the hooks of the conveyer, are liable to slip under the blank without catching over its edge, and the paper is wasted. The conveyer consists of a square frame which moves backward and forward in slides, $h^1$, that are rigidly attached to the platform B by means of standards or brackets, $h^*$. Motion is imparted to it by the action of an arm, $h^{1*}$, which rises from the rock-shaft $f^*$. This rock-shaft receives its motion by an arm, $h^2$, which extends from the same over a cam, $h^3$, on the main driving-shaft, and which is held in contact with said cam by a spring, $h^{2*}$, applied under the platform B. The arm $h^{1*}$ connects with the conveyer H by a link, $h^{**}$, and this link is provided with a balance-weight, $h^{3*}$, which serves to counteract the weight of the conveyer as the same reaches its extreme position, and prevents the same from assuming a vibrating motion when the machine is worked rapidly. By the action of the conveyer the blank is moved forward over the creasing-box I, and under the plunger J, and in order to keep said blank in the proper position while it lies on the box, and before the plunger has come down upon it, two arms, $c^{**}$, are applied in such a position that they extend parallel to the edges of the box. The lower edges of these arms are intended to be level with, or rather below, the top edge of the gum-box, so that they bear down upon the ends of the blanks and hold them in position, as shown in fig. 4, of the drawing, and said arms may either be secured to the table C, or to any other fixed part of the machine. The creasing-box I consists of an oblong square frame, open at top and bottom, so as to form two creasing edges, $i$ $i^*$, one at the top and the other at the bottom. The sides of the box are cut open to give access to the folding-fingers K. The blank which has been brought over the box I by the conveyer H, is carried down by the plunger J, which is secured to a rod, $j$, suspended from a cross-head, $j^*$, and which is carried up by the action of a cam, $j^1$, on the central stem or rod $j^2$. The cross-head, with the plunger, descends by its own inherent gravity. On being carried through the box I the blank is creased, and it is carried down by the plunger a little below the lower creasing edge, when the plunger ascends again, ready for a new move. In the mean time the bed L moves up from below to support the envelope, and the folding fingers turn in one after the other, so as to carry the flaps of the envelope down to their final position. The plunger J carries down a second blank, the fingers K are drawn back, and the envelope lying on the bed is pressed by the descending plunger. The bed L recedes, the finished envelope drops down, and the second blank which had been carried down by the plunger remains in the lower creasing edge, while the plunger recedes to admit a new one. From this description it will be seen the plunger does not make any unnecessary motions; on each descent it creases a blank, and at the same time the finished envelope receives it final pressing before it is pushed out below. The pressing of the finished envelope is effected by a crank, M, which carries a cam, $m$, that acts upon a stud or roller, $m^*$, secured to the central stem $j^2$, which carries the cross-head and plunger, (see fig. 7.) The cam $m$ is adjustable in a slot in the crank, so that it can be made to act on the roller $m^*$ with more or less power, according to the desired pressure. The bed L is secured to a rod, $l$, which is raised up by the action of a cam, $l^*$, on the main driving-shaft, and the folding-fingers K are also moved by the action of cams $k$ on the main driving-shaft. The cams $k$ are made to act on rods $k^*$, the upper ends of which form toothed racks to gear in pinions $k^1$, on rock-shafts $k^2$, to which the fingers are secured. Spiral springs secured to these shafts hold the rods $k^*$ down upon or in contact with the cams $k$. The fingers K are provided with hinge-joints, $k^3$, whereby they are enabled to accommodate themselves more readily to their work, and to be withdrawn from between the plunger J, and bed L, without causing any part to bind or to become injured. It must be remarked that these fingers are not intended to crease the blanks before folding, nor to press the flaps after they have been folded. Their function is simply to turn the flaps of the envelopes down after they have been creased by the action of the plunger and creasing-box, and to hold them in that position until the plunger descends again and gives to the envelopes the final pressing. In order to give to the envelopes the proper finish, and to press them on those parts where it is particularly needed, the edge of the plunger is raised all round on its face, and it is provided with two ribs or ledges, $j^4$, (see fig. 5,) which are of equal height to the outside edge, and which are so situated that they press that portion of the envelopes to which the paste has been applied. There are three thicknesses of paper on that place where the envelope is pasted, and only two on the edges; consequently the paste is pressed more than the edge, and the edge is left round and full as desired. We have now described the construction and operation of one-half of our machine; the other half is precisely the same, and both plungers are attached to the same cross-heads, so that for each revolution of the main driving-shaft two envelopes are finished.

What we claim as new, and desire to secure by Letters Patent, is—

1. The employment of a movable carrier E, in combination with the rising and falling lifters F, constructed and operating in the manner and for the purpose substantially as herein specified.

2. The arrangement of the table C over the conveyer H, substantially in the manner herein described, so that the blanks are held even and in place by the table while being carried by the conveyer to the creasing-box.

3. The slotted lifters F, in combination with the bar $c^*$, in the table C, as and for the purpose herein specified.

4. The arms $c^{**}$, attached to the table C, or to any other fixed part of the machine, and operating in combination with the conveyer H, substantially as and for the purpose set forth.

5. Feeding the blanks under the table or platform which supports the gum-box, instead of over it.

6. The weights $c^2$, on the front edge of the table, in combination with the conveyer H, applied and operating substantially as and for the purpose set forth.

7. The balance-weight $h^{3*}$, in combination with the conveyer H, applied and operating in the manner and for the purpose herein specified.

8. Arranging the fingers K in such relation to the plunger J that they hold the flaps of the envelope which have been creased by being passed through the box I, until the plunger descends again and completes the envelope by pressing, as set forth.

9. The arrangement of hinge-joints $k^3$, in the shanks of the folding-fingers K, in the manner and for the purpose substantially as described.

10. The cam $m$ and roller $m^*$, or its equivalent, in combination with the plunger J, constructed and operating substantially as and for the purpose specified.

11. Passing the plunger J below the lower creasing edge $i^*$, of the box I, in the manner specified, so as to push the finished envelope clear off the box, and leaving the creased envelope below the lower edge of the box, to prevent the same from going back with the plunger.

12. The ribs or ledges $j^4$, on the face of the plunger, as and for the purpose described.

GEO. H. REAY,
LOUIS NEGBAUR.

Witnesses:
W. HAUFF,
RUDOLF WUSTE.